UNITED STATES PATENT OFFICE.

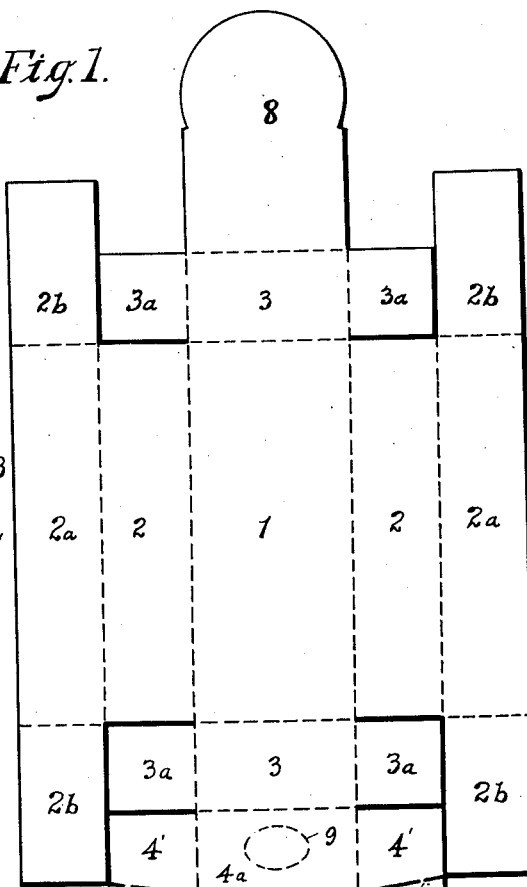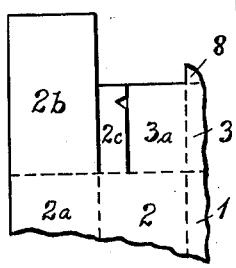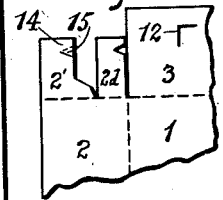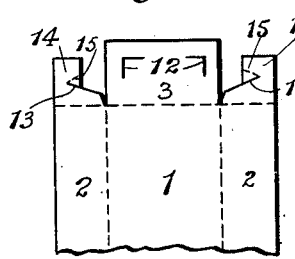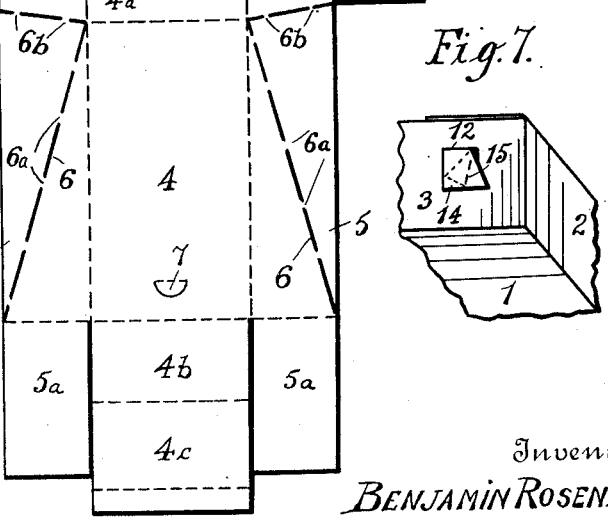

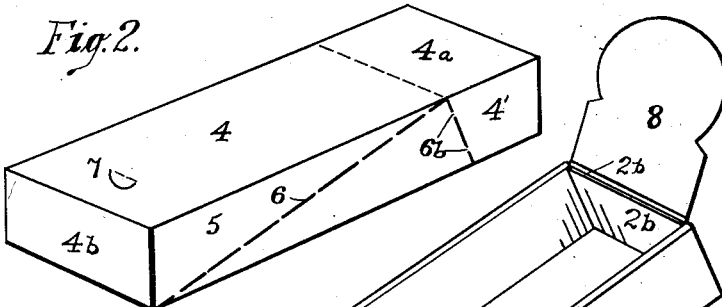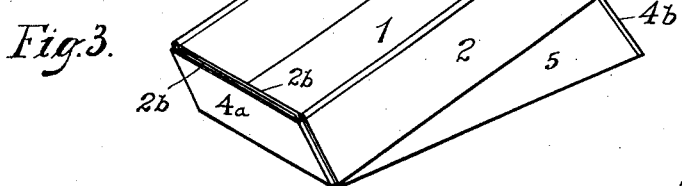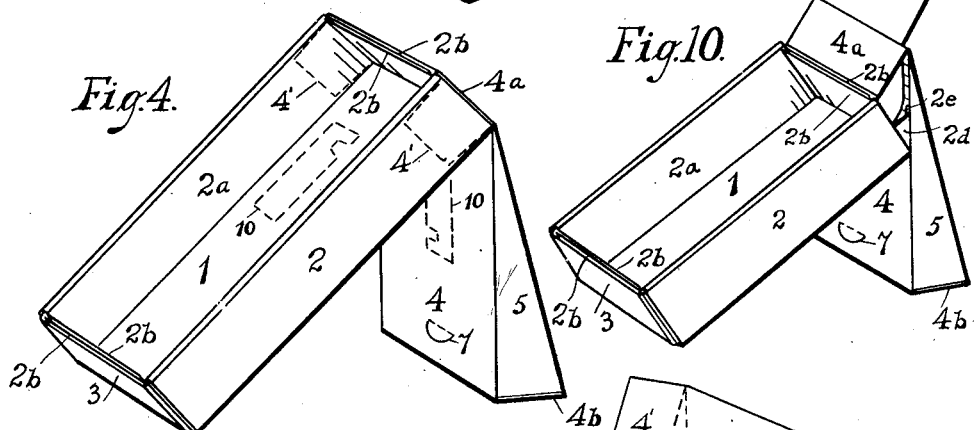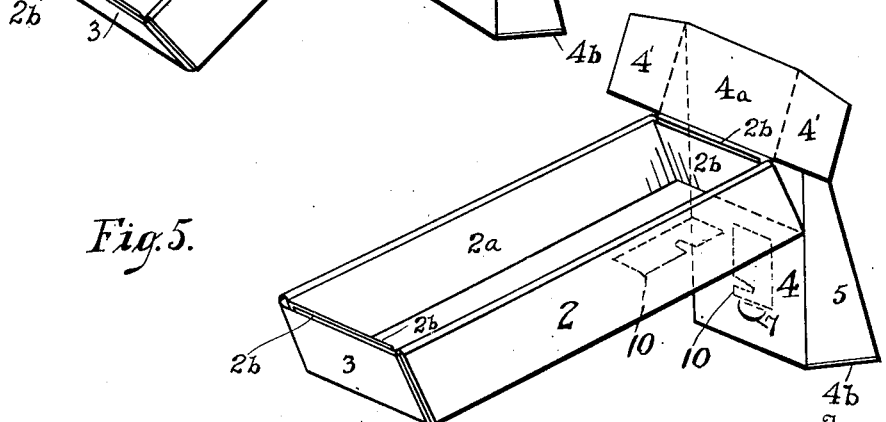

BENJAMIN ROSENBERG, OF BROOKLYN, NEW YORK.

RECEPTACLE FOR DISPLAY.

1,374,953. Specification of Letters Patent. Patented Apr. 19, 1921.

Application filed January 18, 1917. Serial No. 143,100.

*To all whom it may concern:*

Be it known that I, BENJAMIN ROSENBERG, a citizen of the United States, residing at Brooklyn, in the county of Kings and State of New York, have invented certain new and useful Improvements in Receptacles for Display, of which the following is a specification.

My invention relates to receptacles for the display of merchandise; such as boxes or cartons that can be made of cardboard and folded into the required shape.

The primary object of my invention is to provide a box or carton of cardboard or other suitable material, comprising a body and a lid or cover therefor; the cover being preferably hinged to the body and adapted to support the body in position to present the contents thereof in a conspicuous manner.

My invention will be described in connection with the accompanying drawings, which disclose one or more embodiments thereof; but it is to be understood that I may vary the constructions actually shown, within the scope and spirit of my invention, as indicated by the terms in which the claims are expressed, and by variations in the wording of the same.

On the drawings:—

Figure 1 is a plan view of a blank of suitable material, out of which my improved receptacle is preferably made;

Fig. 2 is a view of the finished receptacle with the parts in closed position;

Fig. 3 is a view showing the receptacle with the parts in the position they occupy for the display of the contents;

Fig. 4 is a similar view showing another way of setting up the receptacle to be exhibited;

Fig. 5 shows a third way of utilizing my receptacle when the merchandise in it is to be exposed to prospective purchasers;

Fig. 6 shows a detail, illustrating how my receptacle can be constructed from a modified form of blank;

Fig. 7 is a perspective view, showing how the parts of the blank of Fig. 6 can be secured together;

Figs. 8 and 9 are details similar to Fig. 6, but showing a modified method of constructing the blank out of which my improved receptacle is formed; and Fig. 10 is a view similar to Fig. 5, showing the receptacle constructed as indicated by either Fig. 8 or Fig. 9, and set up in display position.

The same characters of reference indicate the same parts on all the views.

I construct my receptacle or box preferably, but not necessarily, out of a blank of suitable material, such as pasteboard or cardboard, comprising a portion for making the body of the receptacle and another portion for making a lid or cover to close the same. The box or carton is also shaped, as is clearly set forth hereinafter, so as to support the body, when the receptacle is opened, in advantageous position for the display of the contents.

By reference to Fig. 1 it will be seen that the portion for making the body includes a section 1 constituting the bottom of the receptacle, and arranged around the section 1 are sections constituting sides 2 and ends 3. I make score lines, or otherwise provide creases, in the blank along the boundary lines between the bottom, ends and sides, to enable the sides and ends to be bent up, as required. These and similar score lines, which are of course made in one face only of the blank, and do not go through the cardboard, are indicated by broken lines; while the full lines within the periphery of the blank indicate places where the blank is cut through from one face to the other. The sides 2 are connected with extensions $2^a$, elongated beyond the extremities of the sides, as at $2^b$; and the ends 3 have terminal extensions $3^a$. In order to permit the extensions to be bent or folded with reference to the sides and ends, I score the blank further to make creases or the like along the boundary lines between the sides 2 and extensions $2^a$ along the boundary lines between the ends 3 and the extensions $3^a$; and across the extensions $2^a$ at the extremities of the sides to mark off the extremities $2^b$. These extremities $2^b$ are equal in length to the width of the bottom 1.

In Fig. 1, the inside or upper face of the bottom 1 is presented to the observer; and so are the inner faces of the sides 2 and ends 3.

To give the body its proper form, the sides 2 with extensions $2^a$, and ends 3 are folded up with respect to the bottom 1; and the extensions $3^a$ are bent inward and caused to make contact with the inner faces of the sides at the extremities of the latter. The extremities $2^b$ are folded back on the outside of the extensions $2^a$, which is the lower side in Fig. 1; and the extensions $2^a$ are bent over to the inside of the box and against the inner faces of the sides 2. Hence the extensions $3^a$ will be completely hidden; lying between the sides 2 and extensions $2^a$. The extremities $2^b$ are then turned away from the extensions $2^a$ about ninety degrees, and caused to extend across the box, in contact with the inner faces of each of the extensions $2^a$. The extremity $2^b$ of each extension $2^a$ thus abuts the extension on the opposite side of the box, and the extensions $2^a$ are thus held down against the inner faces of the sides; whereby the sides, ends and bottom are kept in proper relation, and the form of the box maintained. See Fig. 3.

With regard to the portion of the blank out of which the cover or lid is made, I include therein a section 4, in line with the section 1, and ends 3; and constituting the top or upper part of the lid; and I provide in this section a transverse crease or score line which marks off a part $4^a$ next to the adjacent end 3; the blank also being scored along the line between this end and the section 4. To the section 4 is joined a section constituting an end $4^b$; having an extension $4^c$, with a transverse crease or score line near its outer edge; and the usual crease or score lines will mark off the end $4^b$ from the top 4 of the cover, and the extension $4^c$ from the end $4^b$. Sections constituting sides 5 are connected to the lateral edges of the section 4; and in the blank, these sections will begin at the extensions $3^a$ and run as far as the end $4^b$. At their extremities they will have extensions $5^a$, as long as the width of the top; and additional creases or score lines will separate the extensions $5^a$ from the sides, and the sides from the section 4.

The face of the cover 4 shown to the observer in Fig. 1 is the under or inner face; and the surfaces of the sides and end are the inner surfaces, as will be understood.

To shape the cover, the extensions $5^a$ are first folded down upon the inner faces of the sides 5, and the sides are then bent up to a right angle with the top. The extensions $5^a$ are then turned out or back through a right angle, till they lie along the crease at the lower edge of the end $4^b$, between this end and the section 4. This end is now bent up, and the extension $4^c$ is folded down into the cover and over the extensions $5^a$; and the edge of the extension, beyond the crease therein, is held flat against the inner or lower face of the top 4; a tab 7 in the top being lifted up and then forced down over the edge of the extension on the end to lock it in place. The cover may close the box by being turned on the hinge provided by the crease along the line between the section 4 and the adjacent end 3. The sides thus extend from one end of the box to the other, and efficiently close up the box when the cover is down, as in Fig. 2.

To open the box and put it with the contents on display, the parts may be adjusted into the position shown in Fig. 3. The cover is turned till the section $4^a$ lies against the end 3, and the rest of the cover is folded under the box to elevate it. Before this is done, however, parts of the sides must be detached; and I provide for this, as shown in Fig. 1, by making diagonal cuts 6 in the sides from the inner corners of the extensions $5^a$ at the outer edge to the nearest corners of the part $4^a$. These cuts are not continuous, but leave at intervals small bits of box material making stays $6^a$ which maintain the parts to be detached in connection with the remainder of the sides. Adjacent the corners of the part $4^a$, the cuts may turn outward, as at $6^b$; marking off areas $4'$ at the extremities of the sides, which may remain as projections from the ends of the part $4^a$; for a purpose that will appear later.

To set up the box as in Fig. 3, the sides 5 are broken along the cuts 6 and $6^b$, by tearing through the stays $6^a$; leaving the projections $4'$ and the triangular parts of the sides between them and the extensions $5^a$. If desired, the projections $4'$ may also be detached by tearing along the creases between them and the part $4^a$ of the top. If this is done, the box in display position will present the appearance portrayed in Fig. 3; the cover being under the body and the triangular parts of the sides which remain increasing in height toward the back of the box. Hence the receptacle will be supported at an incline forward; whereby the contents will be held up plainly to view. If desired, the sides 5 may be broken away along the cuts 6 and $6^b$, when the blank is stamped out, or before the blank is folded to make the box; leaving only the triangular or wedge-shaped remaining portions which appear in Fig. 3. The edges of these portions, as shown in Fig. 3, converge from the end $4^b$ toward the part $4^a$ by reason of the fact that the sides are wedge-shaped, as stated. The projections $4'$ may be broken off before the blank is folded also, if these projections are not to be retained.

To the opposite ends may be attached a member 8, which will keep an upright position, and have advertising matter on its front face. This member will make the receptacle and the merchandise therein even more conspicuous. It may be in the form of a section 8 constituting another part of the blank shown in Fig. 1; and it will project out as a flap from the end 3 opposite the end to which the cover is attached. The blank will be scored between the section 8 and the adjacent end, and when turned up, the stiffness of the material of which the blank is made will ordinarily be sufficient to hold it in upright position or nearly so.

When the receptacle is opened to be put thus on display, the projections 4' may also be detached, as stated, but it is better to fold them against the part 4ª of the cover, so as to lie between it and the end 3. If they are thus retained, they will be utilized to set up the box in the manner illustrated by Fig. 4. On this view the box is shown with the other end elevated; so that the receptacle is held at a greater incline, and the goods are made somewhat more prominent. In order to keep the part 4ª against the adjacent end 3, the projections 4' are pushed in between the extensions 3ª and the sides 2, and they will be held tight enough to keep the raised end 3 and the part 4ª close together. In order to facilitate the insertion of the projections 4' between the extensions 3ª and the sides 2, these projections, or tongues, may be trimmed, as by cutting off corners, etc., to give them the most convenient shape. The form of the projections or tongues 4' in Fig. 4 is diagrammatic, and not intended to illustrate the best form of projection for the above-mentioned purpose. Obviously any one skilled in this art could, without effort, give these tongues the shape required. Hence, the box will be kept rigid and steady. In this case, the member 8 need not be integral with the blank; but may be scored across, inserted between the raised end of the box and the merchandise, and bent up nearly to the vertical; as will be understood; or the member 8 may be omitted altogether. Sometimes gum 9 may be applied to the outer face of the end 3 or the upper face of the part 4 to serve the purpose as the projections 4'; or other suitable means employed.

In Fig. 5, I illustrate the receptacle with the same end elevated as in Fig. 4 by means of the cover, but not to the same degree. The cover is stood on its end as before, but the part 4ª is turned up to act as a connecting and supporting flap for the body of the box; and the face of the part 4ª, thus presented to the front, may have pictorial or other matter thereon, to enable the dealer to dispense with the member 8, if desired. When the receptacle is exhibited in this way, the projections 4' may be removed, or turned behind the part 4ª, or allowed to project out laterally, as illustrated, to make the receptacle and its contents more noticeable.

When the box or carton is set up as in Figs. 4 and 5, the sides 5 may be made other than wedge-shaped, their contour under such circumstances being to some extent quite immaterial.

In the foregoing, the body of the receptacle is supported at an incline by the hinged cover, the sides of which constitute parts having converging edges which are important factors in securing the desired result. The extensions 5ª of the sides, with the end 4ᵇ and the extensions 4ᶜ, serve as means for holding the sides rigid with each other; and, with the top 4, excepting the section 4ª, to keep the receptacle steady. When the receptacle is used as in Fig. 3, the sides are sufficient; but when the box is to be set up as in Fig. 4 the action of the sides and the top 4, including the projections 4', may be supplemented by tongues 10; which may be marked off in the bottom 1 and top 4 by cuts similar to the cuts 6ª in the sides 5, and interrupted by the stays 6ᵇ, to hold the tongues in place till the receptacle is opened. The stays are then broken by the dealer and when the box is set up the tongues are pushed out toward each other and caused to interlock at their ends. This effect can be obtained by notching the extremities of the tongues on opposite sides, bringing the notches into alinement, and pushing the extremity of each tongue into the recess thus made in the notched extremity of the other. Also, a single tongue cut from the bottom or top of the cover, and arranged to engage a slot in the part opposite, may be utilized; or other expedients of the kind adopted.

To exhibit the box as in Fig. 5, such tongues, braces, etc., may likewise be employed when needed. In this case, however, such additional means for holding the body and cover steady are not always necessary, except when the receptacle is comparatively narrow; because the body is not elevated so much, and is therefore more stable as it is.

When the box is to be set up as in Fig. 5, the cover can clearly be manipulated so that the portion carrying the sides 5 can be turned upward and backward so as to be folded on the section 4ª; and then with this section turned into substantially vertical position, so that the portion with the sides 5 will extend below the bottom of the body of the box to support the body at an incline for display. After the cover is thus manipulated, it is secured to the body by the means, such as the tongues, above described. The section 4ª and the remaining portion of the cover on the other side of the transverse crease or fold line therein will then be substantially or approximately vertical, even though there is a small space between them.

Another way of making a blank out of which my improved receptacle can be constructed is depicted in Figs. 6 and 7. I may dispense with the extensions 2ª and the extremities 2ᵇ; and with the extensions 3ª; and replace these extensions, in the portion of the blank constituting the body of the receptacle, with terminal extensions 2' on the sides 2, and angle or L-shaped cuts 12 in the ends 3. The extensions 2' may be narrowed somewhat at their outer ends and are scored about half way across with a diagonal cut 13, making a locking tab 14. The tab 14 is also given a crease or score line 15, making an angle of about thirty degrees with the cut 13, and marking off with the cut 13 a triangular point. When the body is given its form, the sides 2 and 3 are bent up, the extensions 2' forced around outside the ends 3, and the tabs 14 into the cuts or slots 12. In order to enable this to be done, the triangular point of the tab 14 is first bent or folded over against the face of the tab along the crease 15, to diminish the width of the tab, as indicated by the dotted lines in Fig. 7; and facilitate the passage of the tab through the cut; and after each tab is through its cut, this point is bent over against the inner surface of the ends 3; giving the tab its full width and locking the ends and sides together as shown in full lines in the view just mentioned.

This formation is utilized for both ends of the body; and for the portion making up the cover likewise. The extension $4^c$ will be discarded, and cuts 12 made in the end $4^b$; while instead of the extensions $5^a$ the sides 5 will have extensions like 2', with cuts 13 and creases 15. Hence the ends and sides of the cover will be fastened the same way as the sides and ends of the box. Such a blank may of course have sides 5 with cuts 6 and $6^b$ and projections 4', as in Fig. 1; or the portions marked out by the cuts 6 and $6^b$, together with the projections 4', may be removed when the blank is first produced, if preferred.

When a blank of the kind shown in Figs. 6 and 7 is used, the receptacle when closed will appear as in Fig. 2; and when opened with parts of the sides 5 detached, as in Fig. 3; it can also be set up as in Figs. 4 and 5; but in the former case, the projections 4' cannot be pushed into the body, but must be broken off; and gum 9, tongues 10, etc., utilized instead; or, if desired, these projections 4' may be retained, and slots to receive them be provided in the sides 2, when the box is set up as in Fig. 4. When set up as in Fig. 3, the receptacle may be left with the projections 4' outstanding in front as in Fig. 5, regardless of the type of the blank employed. The member 8 may of course be attached to the end 3.

My improved box is therefore, in all its forms, very simple and practical, and by making the proper adjustments, can be set up in various ways. It is an efficient storage receptacle, as well as being adapted for display purposes; costs comparatively little to manufacture; and can be manipulated by any one without difficulty in order to be used in the desired manner.

I may modify the blank shown in Fig. 1 in a manner indicated in Fig. 8; by making the extensions $3^a$ a little bit shorter; thus providing between each of these extensions and the extremities $2^b$ on the extensions $2^a$ room for a tongue $2^c$ at each side of the blank. If the box is to be constructed out of a blank having ends with L-shaped slots; and sides with extensions 2', provided with tabs 14 having foldable points 15; as described above in connection with Figs. 6 and 7; I may modify the blank shown in Fig. 6 in the same way; that is, I may make the extensions 2' of such width as to leave room between each of them and the end 3 for a tongue $2^d$, as indicated in Fig. 9. These tongues $2^c$ and $2^d$ will be utilized only at that end of the body 1 to which the lid or cover is connected; and the opposite end of the body of the box or receptacle will remain unchanged, as in Fig. 1 or in Fig. 6, as the case may be. The purpose of these additional tongues or extensions $2^c$ and $2^d$ is to enable my box or carton to be set up as shown in Fig. 10; whereon the lid or cover will have a pair of slots $2^e$, one at each side, and the tongues $2^e$ or $2^d$, as the case may be, will be inserted into the slots $2^e$. The tongues $2^c$ and $2^d$ may be notched at any point along their lower edges to hold the lid and the body of the box in the desired relative positions.

In Fig. 10 I also show a member $8^a$ corresponding to the member 8 in Figs. 1 and 3. This member, in the construction illustrated in Fig. 10, is provided by cutting through the top part of the lid, beginning with the score line which marks off the portion $4^a$; and when the box is set up, as in Fig. 10, the portion $8^a$ is forced out of the plane of the top of the lid and put into position where the advertising matter on its front face can be seen.

Although I described my box or carton in the foregoing as being made out of a single blank, it is obvious that I may construct it otherwise than out of a blank; as by making up separate pieces and attaching the same together so as to arrive at the same ultimate construction.

Having described my invention, what I claim to be new, and desire to secure and protect by Letters Patent of the United States is as follows:—

1. A receptacle having a body and a lid hinged thereto, the lid being adapted to be stood up on one end to support the body in display position, and means for holding the lid and the body in the desired relative locations.

2. A receptacle comprising a body and a lid or cover hinged thereto, said lid or cover having a transverse fold therein between its extremities, and having a tongue extending therefrom to engage the body and support the latter for display.

3. A receptacle comprising a body and a lid hinged thereto adjacent one end, said lid having a transverse fold therein between its extremities, and having tongues extending from its lateral edges between said transverse fold and one end thereof, to engage the body when the lid is stood up on end and support the body in display position.

4. A receptacle having a body and a lid hinged thereto, said lid having a transverse crease or fold line between its extremities, the lid being adapted to be bent along said line and stood up on one end to support the body in display position, and means for holding the lid and the body in proper relative locations.

5. A receptacle having a cover hinged thereto, the cover comprising sides to close the receptacle, the cover having a transverse crease in its top and cuts in its sides to enable parts of the sides to be detached, leaving the remainder of the sides shaped to enable the cover to be bent at the crease and folded to maintain the receptacle in elevated position.

6. A receptacle comprising a body and a lid or cover hinged thereto at one end, said cover being foldable along a line between the hinged end and the opposite end, said lid being adapted to rest upon said opposite end, in vertical position, the body being adapted to be supported at one extremity from the lid by means of the section between said line and the said hinged end, said section then extending upward to said line from said body, and means for securing the lid between said line and said opposite end to said body.

7. A box comprising a body portion, and a cover therefor hinged to the rear end of said body portion, said cover being formed of transverse sections connected by a hinge-line, and the forward section being longer than the body of the rear section and capable of being folded thereon and therewith turned into a substantially vertical position supporting the body of the box in an inclined display position, and said cover being also formed with means for locking it when the box is to be given its display position, to the body portion of the box.

8. A box comprising a body portion, and a cover therefor hinged to the rear end of said body portion, said cover being formed of transverse unequal sections connected by a hinge-line, and the forward section being longer than the body of the rear section and capable of being folded thereon and therewith turned into a substantially vertical position supporting the body of the box in an inclined display position, and said forward section being formed integrally with a hinged lip adapted to engage said body portion and lock said cover thereto when said cover is in its folded prop-position.

9. A box comprising a body portion, and a cover therefor hinged to the rear end of said body portion, said cover being formed of transverse sections connected by a hinge-line, and the forward section being longer than the rear section and capable of being folded thereon and therewith turned into a substantially vertical position supporting the body of the box in an inclined display position, and said box being provided with interlocking parts for securing said cover in its vertical prop-position.

10. A box comprising a body portion, and a cover therefor hinged to the rear end of said body portion, said cover being formed of transverse unequal sections connected by a hinge-line, and the forward section being longer than the rear section and capable of being folded thereon and therewith turned into a substantially vertical position supporting the body of the box in an inclined display position, and said forward section of the cover having side and front end flanges to pass upon the adjacent portions of the body of the box, while the rear section of said cover has no edge flanges and thus is permitted, when the box is in display position, to present a plain surface above the rear end of the body of the box.

11. A receptacle comprising a body and a lid or cover hinged thereto at one end, said cover being foldable along a line between the hinged end and the opposite end, said lid being adapted to rest upon said opposite end in vertical position, the body being adapted to be supported at one extremity from the lid by means of the section between line and said hinged end, said section then extending upward to said line from said body, and means for securing the lid and body to each other.

12. A receptacle comprising a single blank bent to form a body and a cover hinged to one side of the body, the latter being formed to enable it to be lifted and folded along a transverse line between its ends to enable the end of the cover to be carried below the plane of the bottom of the body, the body then being capable of being supported by the aid of the cover, with said side elevated, to display the contents.

13. A receptacle comprising a body and a cover therefor, the cover being provided with sides to enable the cover to close up the receptacle completely, the cover also having a transverse crease in its top and cuts in said sides to enable parts of the sides to be detached, leaving the remainder of the sides so shaped as to permit the cover to be bent at the crease, and, with the aid of the sides, maintain the receptacle in elevated position.

14. A blank for a receptacle, comprising a portion for making a body, said portion including sections constituting sides of the body, said sections having extensions elongated beyond both ends of said side sections a distance substantially equal to the width of the receptacle, the portion also including sections constituting ends of the body, said last named sections also having terminal extensions.

15. A blank for a receptacle, comprising a portion for making a body, said portion including sections constituting sides of the body, said sections having extensions along their outer edges, said extensions being elongated beyond both ends of said sides a distance substantially equal to the width of said receptacle, said portion also including sections constituting ends of said body, said last named sections having terminal extensions.

In testimony whereof, I have signed my name to this specification this 29th day of December, 1916.

BENJAMIN ROSENBERG.